UNITED STATES PATENT OFFICE.

EDWARD SACHS AND WILLIAM H. BALL, OF DAYTON, OHIO.

IMPROVEMENT IN COMPOSITIONS FOR COATING STRAW-BOARD.

Specification forming part of Letters Patent No. 149,684, dated April 14, 1874; application filed December 29, 1873.

*To all whom it may concern:*

Be it known that we, EDWARD SACHS and WILLIAM H. BALL, both of Dayton, in the county of Montgomery, State of Ohio, have invented a Composition for Coating Straw-Board, of which the following is a specification:

Our invention consists in a composition to be applied to straw-board to give a finish to the surface of such board, to adapt it for use in the manufacture of boxes, &c.; and is designed to be used as a substitute for the lining of white or colored paper heretofore employed for that purpose.

This composition consists of substantially the following ingredients, viz: White clay, such as English, China, or Carolina clay, liquefied curdled milk, dextrine, and glycerine. These are combined in substantially the following proportions, and in substantially the following manner:

Take curdled milk, and liquefy it by the addition of carbonate of soda, ammonia, or their equivalents, and mix gradually fourteen pints of the liquid thus formed into five pounds of white China clay. Dissolve three pounds of dextrine in sixteen pints of water, and add one pint of the solution to the mixture of clay and liquid. To this add also one pint of glycerine.

To give this composition a pearl-white color, add a small portion of ultramarine blue; and it may be further whitened, if desired, by the addition of not exceeding one-fifth of air-slaked lime.

In this composition the dextrine serves to fasten the coloring to the surface of the straw-board or straw paper, and the glycerine to render the coating more pliable, and to prevent it from cracking or peeling.

In using a composition other than white, water, sour beer, sour wine, vinegar, or the like, may be substituted for the sour milk, and alum may be added, if desired, to fix the colors. A pigment of any desired color may be employed. Some changes in the proportions of dextrine and glycerine may be necessary to suit the various pigments. A fine gloss may be obtained by the addition of sizing, and passing the coated board through heated rollers.

This composition may be applied cold, either by hand or by machine, to either or both surfaces of straw-board or straw-paper. In applying it by machine, a convenient mode is to take up the composition upon the surface of a metal roller, from which it is transferred, by a revolving brush, to the surface of the straw board or paper, upon which it is evenly distributed by a succession of reciprocating brushing-surfaces, or equivalent devices. It passes thence to a suitable drying apparatus.

The composition should be sufficiently thin to be readily distributed by the rollers and brushes, and to reach the drying-box without becoming so dry that the surface will be roughened by the successive brushing operations.

We do not wish to be understood as confining ourselves to the exact proportions or ingredients named, as the former may be varied, and equivalents substituted for the latter, without materially changing the character of the composition.

What we claim as new, and desire to secure by Letters Patent, is—

1. A composition of liquefied curdled milk, clay, dextrine, and glycerine, to be applied to the surface of straw board or paper for finishing the same, and as a substitute for paper lining.

2. The combination of clay, dextrine, glycerine, and any coloring pigment to be used in making a colored coating for straw board or paper.

EDWARD SACHS.
WM. H. BALL.

Witnesses:
C. G. HALE,
JEREMIAH F. TWOHIG.